United States Patent [19]

Gutt

[11] Patent Number: 4,749,320

[45] Date of Patent: Jun. 7, 1988

[54] SELF-LOCKING TORQUE PREVAILING LOCKNUT

[76] Inventor: Andreas Gutt, 69 Oldbury Road, Worcester, County of Herford & Worcester, England

[21] Appl. No.: 866,760

[22] Filed: May 27, 1986

[30] Foreign Application Priority Data

Jun. 26, 1985 [GB] United Kingdom ............... 8516100
Dec. 19, 1985 [GB] United Kingdom ............... 8531343

[51] Int. Cl.⁴ ............................................. F16B 39/34
[52] U.S. Cl. .................................. 411/304; 411/433; 411/947
[58] Field of Search ....................... 411/301–304, 411/432, 433, 947; 277/9, 10, 11

[56] References Cited

U.S. PATENT DOCUMENTS

| 1,009,303 | 11/1911 | Hansen | 277/9 |
| 1,893,067 | 1/1933 | Arenz | 411/304 |
| 2,502,642 | 4/1950 | Currlin | 411/303 |
| 3,520,342 | 7/1970 | Scheffer | 411/303 |

FOREIGN PATENT DOCUMENTS

| 517584 | 2/1940 | United Kingdom | 411/302 |
| 533133 | 2/1941 | United Kingdom . | |
| 662298 | 12/1951 | United Kingdom . | |
| 1172678 | 12/1969 | United Kingdom . | |
| 1384600 | 2/1975 | United Kingdom | 411/302 |

Primary Examiner—Neill Wilson
Attorney, Agent, or Firm—Jeffers, Hoffman & Niewyk

[57] ABSTRACT

The metallic body of the nut is formed with a groove into which is inserted an elongate flexible compressible insert which may be rectangular, hexagonal or circular in cross-section and which may be made of, for example, nylon or a fibrous material. After use, the insert is removed from the groove, is indexed about its longitudinal axis to present an unmutilated face or portion and is then put back into the groove with said unmutilated face or portion facing radially inwardly.

The groove may be continuous or it may be interrupted by an end stop in order to prevent movement of the insert along the groove during screwing-on of the nut; in such a case, the insert length is less than the circumferential length of the groove.

An extraction hole, extending either radially or axially of the nut through the nut body into the groove, facilitates removal of the insert from the groove for indexing or replacement.

12 Claims, 3 Drawing Sheets

SELF-LOCKING TORQUE PREVAILING LOCKNUT

BACKGROUND OF THE INVENTION

1. Field of the Invention.

This invention relates to self-locking nuts.

2. Description of the Prior Art.

It is a requirement, in many engineering applications, to be able to lock nuts in any position to which they are adjusted without the locking device causing any disturbance of the nut position; in connection, for example, with adjustable ball and taper roller bearings, it is of the utmost importance (when an adjustment has been made in order to give correct running conditions) that the subsequent locking of the parts in position shall not disturb the adjustment. A practised method of doing this is to use a self-locking nut with a nylon or fibre annular insert permanently (namely, not removably) incorporated at that bearing face of the nut which does not carry any load; during the screwing-on or application of the nut, said insert offers to the feed a resistance which causes an upward stress which loads the thread flanks of the nut, shaft or spindle, and metal-to-metal locking takes place.

A disadvantage of this locking method or arrangement is that, after each removal of the nut, the annular insert offers less resistance to the feed than was offered on the previous occasion and, as a consequence, the prevailing torque of the self-locking nut is considerably reduced after each removal; this has the result, of course, of making the assembly less secure and of making the selflocking nut unfit to perform its function.

The principal object of the present invention is to provide a self-locking nut which is free from the above-mentioned operation disadvantage.

Another object of the present invention is to provide a self-locking nut which, in use, will not only provide the required degree of metal-to-metal locking when first used but will also provide that required degree of metal-to-metal locking during a number of subsequent uses of the locking nut.

Yet another object of the present invention is to provide a self-locking nut which can be used on an indefinite number of occasions, with optimum metal-to-metal locking, by means of the supply of replaceable inserts each of which is intended to be used a number of times.

SUMMARY OF THE INVENTION

According to a first aspect, the present invention consists in a self-locking nut which includes a compressible flexible elongate insert which is accommodated in a groove in the nut and which is readily removable at will in order to be indexed about its longitudinal axis for the purpose of presenting an unmutilated portion of the insert for engagement of the thread of the shaft, spindle or the like onto which the nut is to be screwed.

The insert referred to in the preceding paragraph may be rectangular in cross-section and, in a generally preferred embodiment of said self-locking nut, is square in cross-section. Alternatively, however, the insert referred to in the preceding paragraph may be hexagonal or circular in cross-section.

In a self-locking nut as described in either of the two preceding paragraphs, the insert may be made of a plastics material (for example, of nylon) or of a fibrous material.

In a self-locking nut as described in any one of the three preceding paragraphs, there may be an end stop which projects into said groove and which is contacted by one end of the insert when said insert moves along the groove during use of the nut. In such a case, the length of the insert is less than the circumferential length of the groove. Said end stop may be removable or fixed or integral with the nut itself.

According to a second aspect, the present invention consists in a method of use of a selflocking nut whereby a consistent locking performance is achieved, said method including the following steps, namely, (1) fitting an unused elongate compressible flexible insert in an annular groove provided therefor in a part of the radially inner periphery of the nut;

(2) applying the nut to a screw-threaded shaft, spindle or the like in order to cause said insert to offer a resistance to the feed by itself engaging the screw-thread of said shaft, spindle or the like;

(3) removing said nut and insert from said shaft, spindle or the like;

(4) removing said insert from its accommodating groove, indexing said insert about its longitudinal axis in order to present an unmutilated surface portion and placing said insert in said groove in such a manner that said unmutilated surface portion faces radially inwardly of the nut; and (5) applying the nut to the or another shaft, spindle or the like in order to cause said insert to offer a resistance to the feed which is of the same order as the resistance previously offered by the unused insert.

BRIEF DESCRIPTION OF THE DRAWINGS.

FIGS. 1 and 2 illustrate two different embodiments of a self-locking nut including an insert, according to the present invention, mounted on a shaft spindle or the like;

DESCRIPTION OF THE PREFERRED EMBODIMENT

Figure 1:
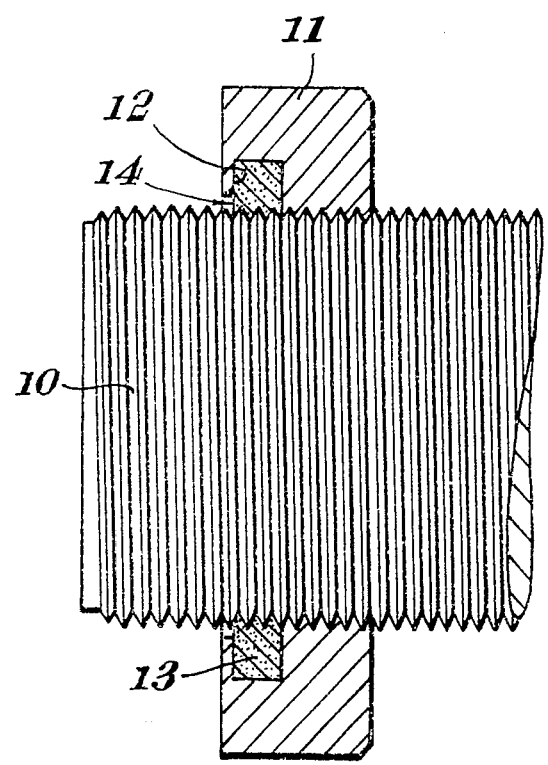

Referring to FIG. 1, there is illustrated a screw-threaded shaft, spindle or similar element 10 (hereinafter referred to as the shaft 10 for brevity) on which there is mounted a self-locking nut 11. Said nut has an annular groove 12 for the accommodation of an elongate insert 13 which is of rectangular (e.g. square) cross-sectional shape. The insert 13 is flexible and is preferably made of nylon or a fibrous material but other compressible materials may well be found to be as suitable as the preferred materials.

The insert 13, being elongate as manufactured, has two ends which are close to one another when the insert has been "sprung" into position in the groove 12. Moreover, the insert 13 is as easy to remove from the groove 12 as it is to place in the groove.

The removability of the insert is an essential feature of the self-locking nut according to the invention because, for the first time, the self-locking nut can be re-used a number of times without there being any deterioration in the quality or degree of locking achieved. Referring to FIG. 1, when the nut 1 has been removed from the shaft 10, one portion of the insert 13 will have become mutilated as a result of the action thereon of the screw-thread on the shaft. The insert is, therefore, removed from the groove 12 and is inserted again with, for example, the face 14 thereof as the radially inwardly directed face; when the nut 11 is screwed onto the shaft 10 again, the unmutilated face or portion of the insert will provide the optimum degree of locking. This indexing of the insert about its longitudinal axis in order to present an unmutilated portion of the insert for engagement with the screw-thread of the shaft 10 is another essential feature and effectively prolongs the life of the self-locking nut without any diminution of locking efficiency from the optimum.

The insert 13 is of rectangular crosssectional shape but said shape could be, for example, hexagonal or circular. When any insert has been used so often that there are no more unmutilated portions which can be presented, the insert is discarded and a new insert is placed in the groove 12.

Figure 2:
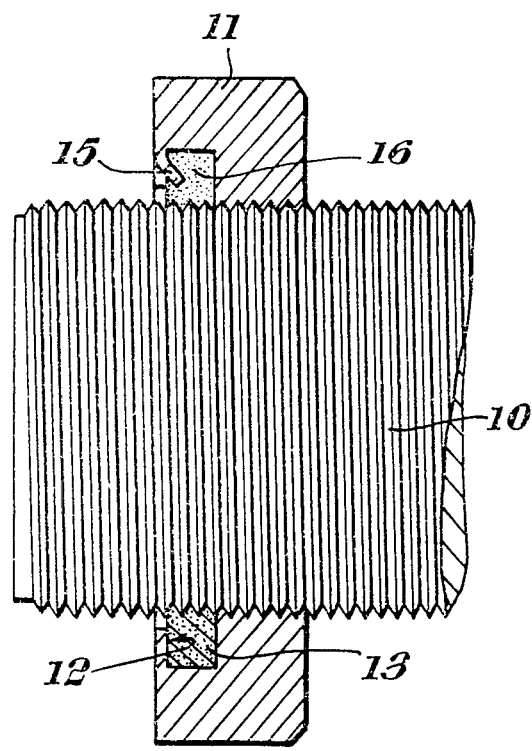
Figure 5:
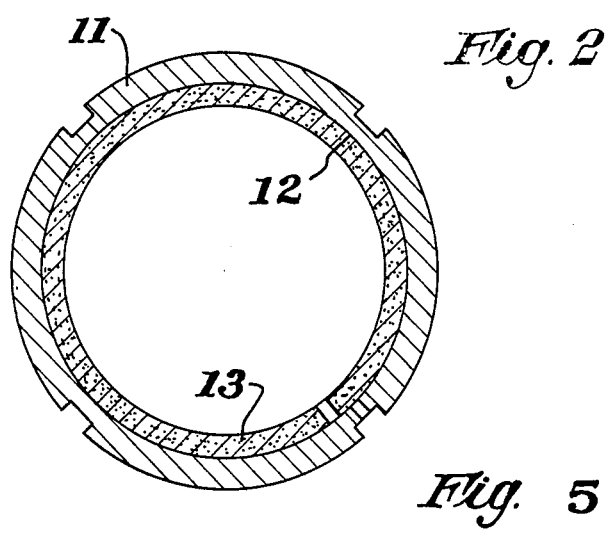

Referring to FIG. 2, in which the same reference numerals have been used as are to be found in FIG. 1, a part 15 of the axially outermost wall of the groove 12 is pressed axially inwardly in order to provide an end stop for one end 16 (or the other end which is not shown) of the insert 13. The end stop will prevent movement of the insert along the groove 12 as the nut is screwed onto the shaft and, obviously, the insert 13 in this particular embodiment is of a length less than the circumferential length of the groove in order that the stop 15 can be accommodated in the gap between the ends of the insert. As an alternative to said stop 15, a dowel pin (not shown) can extend into or be placed in the groove 12 in order to act as a stop.

Figure 3:
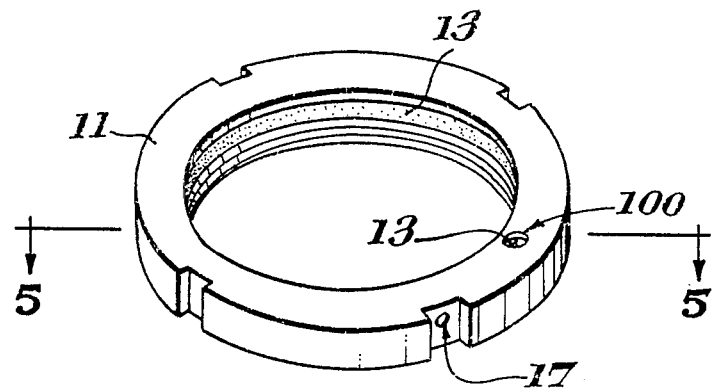
FIG. 3 illustrates another embodiment of a self-locking nut, showing an extraction hole.
Figure 4:
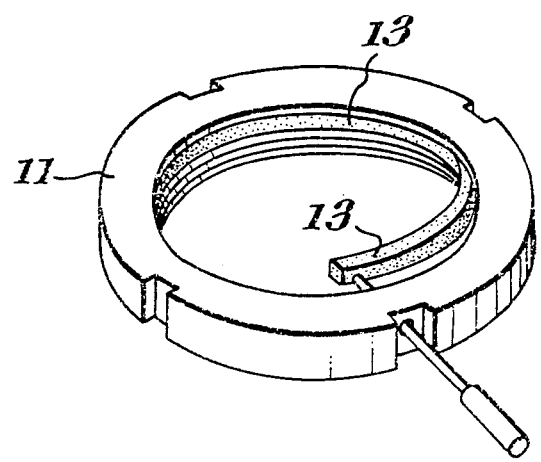
FIG. 4 illustrates the nut of FIG. 3 with the extraction hole being used to assist in the removal of the insert; and, FIG. 5 illustrates a planar cross-section of the insert along the section line 5—5 of FIG. 3.

Referring to FIGS. 3 and 4, in which the same reference numerals have been used again to indicate the parts common to all embodiments, the nut 11 has a radially extending hole or passageway 17 which enables the user to extract the insert 13 by the simple expedient of poking any rod-like device of suitable diameter into and through the hole 17 in order to cause one end of the insert to move radially inwardly of the nut (see FIG. 4). Said one end can then be gripped and the insert can be easily stripped out of the groove 12. If desired, there may be a single hole 17 or a number of holes 17 which are spaced from one another.

It is believed to be the case that, upon compression of the insert material by the screw-thread of the shaft, there is a certain degree of extrusion of the insert material into the radially inner end of the hole 17. This seems to prevent movement of the insert along the groove 12 if the stop 15 is not provided.

Although it is not believed to be important to prevent movement of the insert 13 along the groove during the screwing-on of the nut, there are other ways in which an end stop can be provided. Thus, instead of the removable dowel pin mentioned above or instead of a tension dowel pin, a permanent obstruction may be cast, sintered, welded or otherwise secured in said groove.

As an alternative to (or even in addition to) the one or more than one hole or passageway 17 which extends radially of the nut 11, it is feasible to provide one or more than one passageway 100 (FIG. 3) which extends axially of the nut 11. The or each passageway 100 is so placed as to expose approximately one-half of the depth (radially of the nut 11) of the groove 12, with the consequence that a small portion of the insert 13 is visible as can be seen in FIG. 3. In order to start the removal of the insert 13 for indexing or replacement thereof, the tip of an appropriate tool is inserted into the passageway 100 and is brought to bear against the exposed portion of the radially outer surface of the insert 13; a levering action with the tool will cause one end of the elongate insert to move radially inwardly of the nut 11, whereupon said end can be gripped in order to complete the removal of the insert from the groove.

It will be apparent that users of the self-locking nut described above with reference to the accompanying drawings will be able to purchase quantities of the insert 13, thereby making it possible for a nut according to the present invention to be used an indefinite number of times.

I claim:

1. A self-locking nut for a screw-threaded member, said nut comprising:
    a generally annular nut body with an inner periphery, a radial outer surface and an axially directed outer surface;
    an annular groove in said nut body, which groove is open to said inner periphery;
    a compressible flexible elongate insert having a longitudinal axis, opposite ends and at least two surfaces,
    said insert positioned in said groove for mating engagement of one of said insert surfaces with said threaded member and deformation of said mating insert surface by said threaded member;
    said insert removable from said groove after disengagement of said nut and threaded member, which insert is rotatable about said longitudinal axis and thereafter repositionable in said groove to expose an undeformed surface of said insert surfaces; and,
    an end stop on said nut body, said end stop projecting into said groove, the length of the elongate insert being less than the circumferential length of the groove, said end stop operable to contact one of said insert opposite ends and restrain the movement of said insert in said groove during engagement of said nut and threaded member.

2. A nut as claimed in claim 1, wherein the insert is rectangular in cross-section.

3. A nut as claimed in claim 2, wherein the insert is square in cross-section.

4. A nut as claimed in claim 3, wherein the insert is a plastics material.

5. A nut as claimed in claim 3, wherein the insert is a fibrous material.

6. A nut as claimed in claim 1, wherein the end stop is integral with the nut.

7. A self-locking nut as claimed in claim 1 further comprising an open-ended passageway radially extending through said annular nut body and communicating between said nut body radial outer surface and said groove;
    said radially extending passageway operable to receive a tool to move one of the opposite ends of said insert radially inward of said annular nut to facilitate removal of said insert from said groove.

8. A self-locking nut as claimed in claim 1 further comprising an open-ended axially extending passageway communicating between said nut body axially directed outer surface and said groove;
    said open-ended passageway operable to receive a tool to move one of said opposite insert ends radially inward to facilitate removal of said insert from said groove.

9. A self-locking nut as claimed in claim 7 wherein said flexible insert is deformable at nut engagement with said threaded member for moving a portion of said insert into said open-ended passageway to retain said insert in its location.

10. A self-locking nut as claimed in claim 8 wherein said flexible insert is deformable at nut engagement with said threaded member for moving a portion of said insert into said open-ended passageway to retain said insert in its location.

11. A self-locking locking nut for use in connection with a screw-threaded member and comprising in combination an annular nut body;

a groove in said nut body, said groove facing radially inwardly of said body;

means providing an alternative to tubular and continuous inserts in said groove, said means including a compressible flexible elongate insert which has opposite ends and which is removably accommodated in said groove; and, a passageway having opposite open ends, one of said open ends interrupting a surface of the nut body and the other of said open ends debouching into said groove;

whereby said insert is readily removable at will by engaging the insert by way of said passageway in order to push one of said opposite ends of the insert radially inwardly and by thereafter pulling said insert out of the groove for the purpose of providing said insert to be indexed about its longitudinal axis in order to be so repositioned in said groove as to present an unmutilated portion of the insert for engagement of the thread of said screw-threaded member onto which the nut is to be screwed.

12. A self-locking locking nut for use in connection with a screw-threaded member and comprising in combination an annular nut body;

a groove in said nut body, said groove facing radially inwardly of said body;

a compressible flexible elongate insert which has opposite ends and which is removably accommodated in said groove; and, an axially extending passageway having opposite open ends, one of said open ends interrupting a surface of the nut body and the other of said open ends debouching into said groove;

whereby said insert is readily removable at will by engaging the insert by way of said passageway in order to push one of said opposite ends of the insert radially inwardly and by thereafter pulling said insert out of the groove for the purpose of providing said insert to be indexed about its longitudinal axis in order to be so repositioned in said groove as to present an unmutilated portion of the insert for engagement of the thread of said screw-threaded member onto which the nut is to be screwed.

* * * * *